Patented July 24, 1928.

1,678,405

UNITED STATES PATENT OFFICE.

RENÉ OPPENHEIM, OF LEVALLOIS-PERRET, FRANCE, ASSIGNOR TO SOCIÉTÉ ANONYME LE CARBONE, OF LEVALLOIS-PERRET, FRANCE.

PROCESS FOR RENDERING GAS-ABSORBENT BODIES AIR-TIGHT IN LIQUIDS.

No Drawing. Application filed April 18, 1925, Serial No. 24,234, and in France June 3, 1924.

The present invention has for object a process for rendering impervious to liquids porous bodies, agglomerated or not and conductors or not of electricity, so that these bodies may preserve their properties of permeability to gases or vapours or of absorption of these gases or vapours. This process is particularly applicable to the porous bodies of electrodes of certain types of batteries, electrolyzers and electric accumulators and has moreover the advantages, in this case, of allowing these porous bodies to preserve a good electric conductibility as well as all the above set forth properties, imperviousness to liquids and permeability to gases, whatever may be the direction of passage of the electric current which passes through them and whatever may be the nature of the electrolyte, acid, basic or neutral electrolyte, used in these apparatus.

The invention consists, substantially, in covering or impregnating this porous body with an adherent sheath or mass of air or gas the superficial tension of which is greater than that of the liquids in which the porous body is capable of being immersed.

For that purpose use can be made of a known phenomenon, viz: that the powders at a certain degree of fineness are not moistened by liquids, that is to say do not come in direct contact with them, each particle being encased in a strongly adsorbed sheath of air or gas, that is to say strongly adhering to the surface of the said particle. Owing to this property, when they are immersed in a liquid, water for instance, these powders remain in suspension and do not fall to the bottom of the vessel; this property is particularly noticed in the case of lycopodium powder which, as is known, is obtained in an extremely divided condition.

This property can moreover be destroyed, either under the action of heat, which diminishes the superficial tension of the air or gas, or under the action of a pressure of liquid greater than the said superficial tension.

For carrying out the present invention, on the porous body can therefore be applied, with or without penetration within the same, a substance in such a divided condition that each particle is encased in a strongly adsorbed sheath of air or gas, that is to say strongly adhering to the surface of the said particles.

By this application the air or gas, retained by this substance in an extremely divided condition forms a gaseous screen at the surface or within the porous body. In these conditions, if the porous body is immersed in a liquid, this air or gas, the superficial tension of which is greater than that of this liquid in contact with the porous body, has the effect of preventing the passage of the said liquid within the porous body.

By way of example, the present invention can be carried out by applying on the porous body a continuous and adherent coating of extremely fine charcoal powder, passing for instance through a screen No. 400; this coating has the property, after adsorption of the atmospheric air, of remaining impervious to liquids as just stated and, moreover, of being permeable to gases and a good conductor of electricity.

By the present process, the imperviousness of the porous body is suitably ensured by the gaseous shell adsorbed by the substance in an extremely divided condition and covering the porous body, as if this porous body thus encased is heated at a temperature higher than 80° C., or if it is subjected to a pressure of liquid greater than 4 meters of water, it will be noted that the gaseous layer gradually disappears, that its superficial tension is no longer sufficient for preventing the passage of the liquid, and that the coating applied is no longer impervious to the liquid.

The invention comprises, moreover, a process for obtaining the above mentioned coating.

This process substantially comprises the following operations:

(a) Preparation of a paste constituted by a mixture of coal powder, for instance of charcoal in an extremely finely divided condition, passing for instance through a screen No. 400, and of a binding material leaving after baking a small residue of coke (resin oil for instance);

(b) Application of this paste over the entire surface of the porous body;

(c) Heating of this porous body, thus covered with paste to a temperature sufficient for completely driving off all the hydrocarbons contained in the binding material and obtaining the carbonization of the latter, the coke resulting from this carbonization having the effect of binding together and to the porous bodies the particles of the coal powder, which particles thus form at the surface of the porous body a very hard crust;

(d) Exposure of the porous body, thus covered with this coal coating, to the action of a violent air draught, for the purpose of obtaining an adsorption of air by the particles of the coating, the molecules of air thus adsorbed subsequently preventing any penetration of liquids through the porous body.

The invention comprises also a modification of this process, in which the coal powder is mixed with a volatile liquid the fluidity of which is governed by the degree of impermeability desired, the paste or solution thus obtained being applied on the body to be rendered impervious, this liquid being evaporated and the body thus treated being subsequently subjected to the action of a violent air draught.

Another method of application of the powder, adapted to form the continuous and adherent coating, consists in projecting it on the body to be treated by means of a compressed air atomizer.

Finally the fine powder can be caused to penetrate within the porous body by suction in this body.

The coating obtained in accordance with the present invention is not attacked by most acids and alkalis; moreover, it remains intact whatever may be the direction of the current which passes through the electrode.

This coating can be particularly applied on the depolarizing porous carbon of the porous electrode of certain types of batteries, for the purpose of protecting this carbon against the access of the water of the electrolyte; it is to be noted that owing to the good electric conductibility and reduced thickness of the said coating, the battery will have a small internal resistance.

The present coating can also be used for covering the porous carbon electrodes of certain types of gas accumulators; this coating prevents, in this case, the water of the electrolyte from penetration in these carbon electrodes and maintains this property as well during the charging as during the discharge of the accumulator; it thus permits the electrodes to absorb a large quantity of gas and of consequently supplying a considerable mass energy even though the electrodes be of small size.

In order to clearly show how the invention can be carried out, a few examples will be given hereafter.

A method of carrying out the process consisting in agglomerating the powder with a product subsequently subjected to baking, will first be described.

1000 grams of charcoal powder reduced to the condition of an impalpable powder capable of passing for instance through a screen No. 400, is mixed with 350 grams of resin oil, so as to constitute a paste. This paste is applied by means of a painting brush or of a spatula, over the entire surface of the porous carbon electrode, care being taken to entirely cover this surface without.

The electrode, thus covered with this paste, is then placed in a furnace at the temperature of about 800° C., for the purpose, as above stated, of completely driving off all the hydrocarbons contained in the binding material and of obtaining a carbonization of the latter; this carbonization leaves a coke by which the particles of the charcoal powder are bound together and to the surface of the electrode by constituting a very hard crust.

Finally, the electrode, covered with this coating, is exposed to the action of a violent air draught and, as previously explained, an adsorption of the air by the coating then takes place and the molecules of air thus adsorbed by the carbon particles constituting this coating, subsequently prevent any penetration of liquid in the electrode.

Some examples of impermeabilization of porous electrodes by means of carbon powder mixed with an evaporable liquid will now be described.

1.—Superficial impermeabilization.

In a litre of hot water, at about 60° C., is mixed 50 grams of charcoal in the form of a very fine powder, capable of passing for instance through a screen No. 400. The charcoal is intimately mixed with the hot water and when it is noted that there is no longer any evolution of air in the liquid mass, the solution is ready to be used. The electrode to be impermeabilized is then immersed in this solution during the time considered suitable by the operator, for instance 5 seconds for an electrode surface of 300 square centimeters.

The electrode is then placed in a stove and heated at about 100° C. for evaporating the water which has been introduced during the immersion. When taken out of the stove, the porous electrode is exposed for about a minute to a violent air draught immediately after it has been removed from the stove, that is to say, while it is still hot.

2.—Deeper impermeabilization.

The same procedure as above is adopted but instead of using water as vehicle for the very fine charcoal powder, the mixture is constituted in equal parts in volume of petroleum and water, for instance: 1 litre of water, 1 litre of petroleum, 100 grams of very fine charcoal.

The water and petroleum are mixed together, the mixture of the two liquids is heated in the water-bath and the powder is added. By this method the electrode is impermeabilized to a depth of about 5 millimeters.

3.—*Impermeabilization to the core.*

Use is then made as liquid vehicle of a mixture in equal parts in volume of gasoline and water or of ether and water, or of any other very fluid liquid of small density and water. In this case, the fine powder is mixed with hot water at about 50° C. and the fluid liquid (gasoline, ether, etc.,) is added. The electrode is, as above, placed in a stove for evaporating the liquid and it is subjected to the action of a violent air draught.

Another simple mode of carrying out the process for superficially impermeabilizing the electrode, consists in projecting on the same, by means of a compressed air atomizer, extremely fine carbon powder.

Another modification consists in causing the fine powder to penetrate within the porous electrode, by depression in the electrode, that is to say by creating vacuum in the latter.

Claims:—

1. A process for rendering porous bodies impervious to liquids, and particularly the porous bodies of the electrodes of certain types of electric batteries, electrolyzers or accumulators, which process consists in fixing on the porous body a strongly adhering sheath or mass of air or gas prior to use.

2. A process for rendering porous bodies impervious to liquids, and particularly the porous bodies of the electrodes of certain types of electric batteries, electrolyzers or accumulators, which process consists in applying on the porous body a powder in an extremely divided condition, such as charcoal in the form of a fine powder and then subjecting the product to the action of a violent air draught.

3. A process for rendering porous bodies impervious to liquids, and particularly the porous bodies of the electrodes of certain types of electric batteries, electrolyzers or accumulators, which process consists in mixing a powder in an extremely divided condition with an evaporable liquid, in applying the mixture on the porous body, in evaporating the liquid, and in subjecting the porous body to the action of a violent air draught.

4. A process for rendering porous bodies impervious to liquids, and particularly the porous bodies of the electrodes of certain types of electric batteries, electrolyzers or accumulators, which process consists in mixing carbon powder with water, in applying the mixture on the porous body, in evaporating the water and in subjecting the porous body to the action of a violent air draught.

5. A process as claimed in claim 4, characterized by the fact that the carbon powder is mixed with a mixture of water and petroleum.

The foregoing specification of my "process for rendering impervious to liquids porous, agglomerated or granulous bodies, and particularly porous bodies of electrodes of cells, electrolyzers or accumulators", signed by me this 2nd day of April, 1925.

RENÉ OPPENHEIM.